US010395494B2

(12) United States Patent
Nongpiur et al.

(10) Patent No.: US 10,395,494 B2
(45) **Date of Patent: *Aug. 27, 2019**

(54) SYSTEMS AND METHODS OF HOME-SPECIFIC SOUND EVENT DETECTION

(71) Applicant: Google LLC, Mountain View, CA (US)

(72) Inventors: Rajeev Conrad Nongpiur, Palo Alto, CA (US); Michael Dixon, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,612

(22) Filed: Jul. 31, 2018

(65) Prior Publication Data

US 2018/0365950 A1 Dec. 20, 2018

Related U.S. Application Data

(63) Continuation of application No. 14/748,589, filed on Jun. 24, 2015, now Pat. No. 10,068,445.

(51) Int. Cl.

| | |
|---|---|
| ***G06F 3/00*** | (2006.01) |
| ***G08B 13/16*** | (2006.01) |
| ***G08B 25/00*** | (2006.01) |
| *G08B 13/08* | (2006.01) |
| *G08B 29/18* | (2006.01) |

(52) U.S. Cl.

CPC ....... *G08B 13/1672* (2013.01); *G08B 25/008* (2013.01); *G08B 13/08* (2013.01); *G08B 29/188* (2013.01)

(58) Field of Classification Search

CPC .. G08B 13/1672; G08B 25/008; G08B 13/08; G08B 29/188

See application file for complete search history.

(56) References Cited

U.S. PATENT DOCUMENTS

| | | |
|---|---|---|
| 5,428,345 A | 6/1995 | Bruno |
| 6,263,311 B1 | 7/2001 | Dildy |
| 6,782,847 B1 | 8/2004 | Shemesh |

(Continued)

FOREIGN PATENT DOCUMENTS

| | | |
|---|---|---|
| WO | 2008063700 | 5/2008 |

OTHER PUBLICATIONS

Blei, NG, Jordan, Latent Dirichlet Allocation, Jan. 2003, pp. 993-1022, Journal of Machine Learning Research.

(Continued)

*Primary Examiner* — Munear T Akki

(74) *Attorney, Agent, or Firm* — Morris & Kamlay LLP

(57) ABSTRACT

Systems and methods of a security system are provided, including detecting, by a sensor, a sound event, and selecting, by a processor coupled to the sensor, at least a portion of sound data captured by the sensor that corresponds to at least one sound feature of the detected sound event. The systems and methods include classifying the at least one sound feature into one or more sound categories, and determining, by a processor, based upon a database of home-specific sound data, whether the at least one sound feature is a human-generated sound. A notification can be transmitted to a computing device according to the sound event.

14 Claims, 8 Drawing Sheets

(56) References Cited

U.S. PATENT DOCUMENTS

| | | | | |
|---|---|---|---|---|
| 7,616,115 | B2 | 11/2009 | Horak | |
| 8,655,655 | B2 | 2/2014 | Wang | |
| 8,786,425 | B1 | 7/2014 | Hutz | |
| 9,324,322 | B1 | 4/2016 | Torok | |
| 2001/0033227 | A1* | 10/2001 | Eskildsen | G08B 13/04 340/544 |
| 2004/0088164 | A1 | 5/2004 | Perlo | |
| 2004/0230432 | A1 | 11/2004 | Liu | |
| 2005/0000725 | A1 | 1/2005 | Shiraishi | |
| 2005/0007255 | A1 | 1/2005 | Morris | |
| 2005/0114118 | A1 | 5/2005 | Peck | |
| 2005/0131688 | A1 | 6/2005 | Goronzy | |
| 2005/0131705 | A1* | 6/2005 | Gandhi | G08B 1/08 704/273 |
| 2007/0096927 | A1 | 5/2007 | Albert | |
| 2008/0249779 | A1 | 10/2008 | Hennecke | |
| 2008/0276790 | A1 | 11/2008 | Lemons | |
| 2009/0121861 | A1 | 5/2009 | Latham | |
| 2010/0127878 | A1 | 5/2010 | Wang | |
| 2013/0162821 | A1 | 6/2013 | Park | |
| 2013/0272548 | A1 | 10/2013 | Visser | |
| 2014/0136215 | A1 | 5/2014 | Dai | |
| 2014/0278391 | A1 | 9/2014 | Braho | |
| 2015/0364028 | A1 | 12/2015 | Child | |

OTHER PUBLICATIONS

Burger, Jin, Schulam, and Metze, Noisemes: Manual Annotation of Environmental Noise in Audio Streams, 2012, pp. 1-5, Language Techologies Institute School of Computer Science, Carnegie Mellon University, Pittsburg, PA; CMU-LTI-12-017.

Dhanalakshmi, Palanivel, Ramalingam, Classification of Audio Signals Using AANN and GMM, journal homepage: www.elsevier.com/locate/asoc, 2009, pp. 716-723.

Shin, Hashimoto and Hatano, Automatic Detection System for Cough Sounds as a Symptom of Abnormal Health Condition, IEEE Transactions on Information Technology in Biomedicine, vol. 13, No. 4, Jul. 2009.

* cited by examiner

SYSTEMS AND METHODS OF HOME-SPECIFIC SOUND EVENT DETECTION

BACKGROUND

Some present security systems include a sensor to detect a sound event. Such sensors compare a detected sound with a pre-stored sound to determine whether the detected sound relates to a security event. However, present security systems are limited to determining whether a detected sound is similar to a pre-stored sound, which is the same for all homes having the security system. Moreover, present security systems do not determine whether the detected sound is caused by humans or pets.

BRIEF SUMMARY

Implementations of the disclosed subject matter detect when a sound event in a home is generated, and may alert a user via a notification according to the detected sound event. The implementations may learn sound events that are specific to a home, provide increased confidence on whether a particular sound event is caused by the presence of humans or pets, and identify non-normal sound events as security events. The smart home environment disclosed herein may output an alarm and/or transmit a notification to a device when, for example, the security event is generated.

Implementations of the disclosed subject matter may detect sounds in a home that are determined to be human-generated sounds and/or pet (animal) generated sounds. The implementations may detect sounds that are not generated by a human or animal, and that may be particular to the home. The systems and methods of the implementations may consider the room size and/or reverberation, and/or the distance between a source and a sensor (e.g., microphone) when determining whether the sound is human-generated or non-human-generated.

Implementations of the disclosed subject matter may provide systems and methods of detecting whether a sound event in a specific home is caused by human presence (or pet presence), or by sound sources that are not directly related to human presence (or pet presence). The implementation may first classify the sound event into basic sounds that are typically found in an indoor environment. A generative probabilistic model may be used to model the sound events as part of two classes, namely, a human-related sound-event class and a non-human-related sound-event class. Using the probabilities of the classified sound-events as observed variables and the two classes as unobserved variables, an inference problem may be solved to determine the likelihood that a particular sound event is part of each class. Sound events that have strong likelihood of being part of one of the two classes may be used in more accurately identifying sound-events due to human presence.

According to an implementation of the disclosed subject matter, a method is provided that includes detecting, by a sensor, a sound event, selecting, by a processor coupled to the sensor, at least a portion of sound data captured by the sensor that corresponds to at least one sound feature of the detected sound event, classifying, by the processor, the at least one sound feature into one or more sound categories, and determining, by the processor, based upon a database of home-specific sound data, whether the at least one sound feature is a human-generated sound; and transmitting, by a communications interface coupled to the processor, a notification to a computing device according to the sound event.

According to an implementation of the disclosed subject matter, a security system is provided that includes a sensor to detect a sound event, a processor coupled to the sensor to select at least a portion of sound data captured by the sensor that corresponds to at least one sound feature of the detected sound events, classify the at least one sound feature into one or more sound categories, and determine, by the processor, based upon a database of home-specific sound data, whether the at least one sound feature is a human-generated sound, and a communications interface, coupled to the processor, to transmit a notification to a computing device according to the sound event.

According to an implementation of the disclosed subject matter, means for determining home-specific sounds in a security system are provided, including detecting, by a sensor, a sound event, selecting, by a processor coupled to the sensor, at least a portion of sound data captured by the sensor that corresponds to at least one sound feature of the detected sound event, classifying, by the processor, the at least one sound feature into one or more sound categories, and determining, by the processor, based on a database of home-specific sound data, whether the at least one sound feature is a human-generated sound, and transmitting, by a communications interface coupled to the processor, a notification to a computing device according to the sound event.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter are directed to a smart home environment which may detect when a sound event occurs in a home, determine whether it is a human-generated (or pet-generated), and, if the sound relates to a security event, may transmit alert a user via a notification. Alternatively, or in addition, an alarm may be output according to detected security event. A plurality of sensors which may include audio sensors and/or other types of sensors may be used to increase the confidence that a detected sound may be human-generated by using the co-occurrence of audio data and/or other sensor data (e.g., motion data, image data, and the like). The implementations may learn sound events that are specific to a home, provide increased confidence on whether a particular sound event is caused by the presence of humans or pets, and identify non-normal sound events.

In some implementations, the smart home environment may consider the room size and/or reverberation, and/or the distance between a source and a sensor (e.g., microphone, sound sensor, or the like) when determining whether the sound is human-generated or non-human-generated.

Implementations of the disclosed subject matter may detect sound events by learning sound events that are specific to each home, increase confidence of whether a sound event is human-generated, and identify security events and/or non-normal events from captured sound data.

The implementations of the disclosed subject matter can include one or more processors of the smart home environment that have a first classifier and a second classifier. The first classifier can include a basic sound features decomposition unit and a sound categorization unit. The first classifier may be generally applicable for a variety of smart home environments, and the second classifier may be specific to a particular smart home environment (i.e., a single home).

Figure 1:
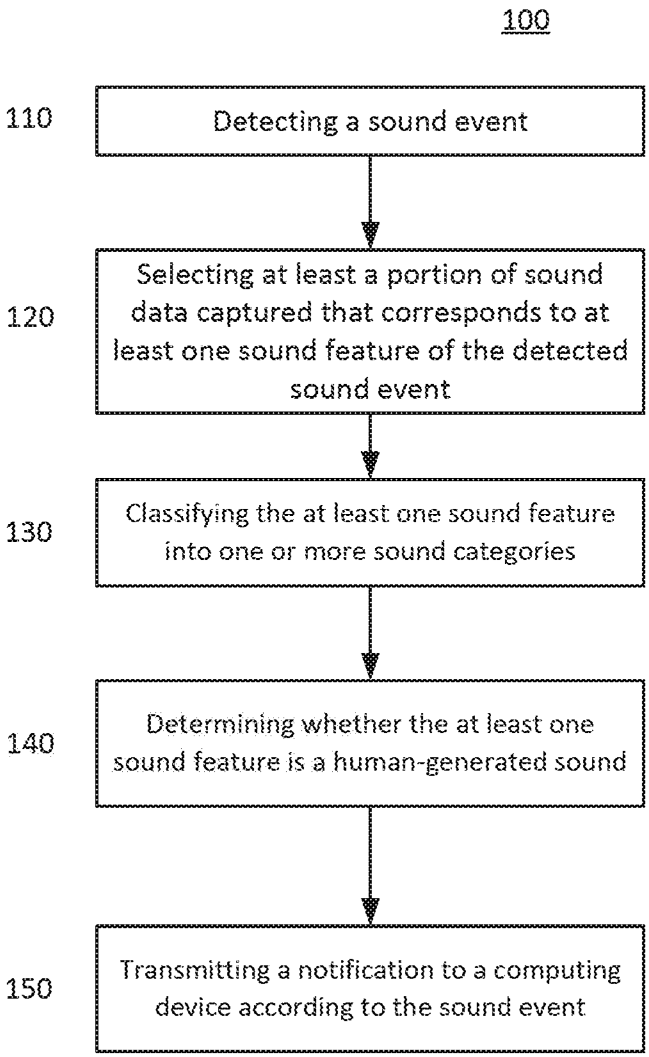
FIG. 1 shows a method of home-specific sound event detection according to an implementation of the disclosed subject matter.

FIG. 1 shows a home-specific sound event detection method 100 according to an implementation of the disclosed subject matter. The method may be implemented by the classifiers shown in FIGS. 2-3 and/or the smart home environment shown in FIGS. 5-7. In operation 110, a sound event may be detected by a sensor of the smart home environment disclosed herein (e.g., as discussed in connection with FIGS. 5-8). A processor (e.g., processor 64 of sensor 60 shown in FIG. 5), may select at least a portion of sound data captured by the sensor that corresponds to at least one sound feature of the detected sound event at operation 120. The processor may classify the at least one sound feature into one or more sound categories in operation 130. The processor, may determine, based on a database of home-specific sound data (e.g., stored a database 77, in a database in the controller 73, and/or in a database of the remote system 74 shown in FIG. 6), whether the at least one sound feature is a human-generated sound at operation 140. A communications interface, coupled to the processor, may transmit a notification to a computing device according to the sound event at operation 150.

Figure 2:
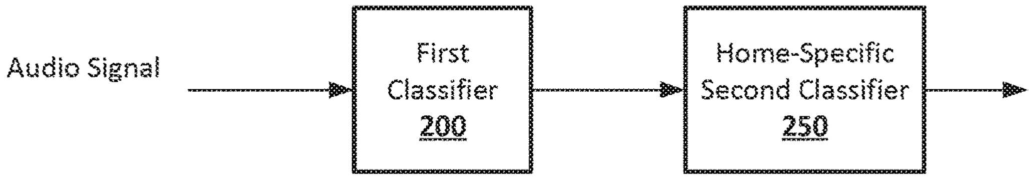
FIG. 2 shows a first classifier to categorize a sound into sound categories, and a home-specific second classifier that uses the output of the first classifier to determine a degree of confidence according to an implementation of the disclosed subject matter.

In some implementations, the classifying may be performed by a first classifier 200 (shown in FIG. 2).

Figure 5:
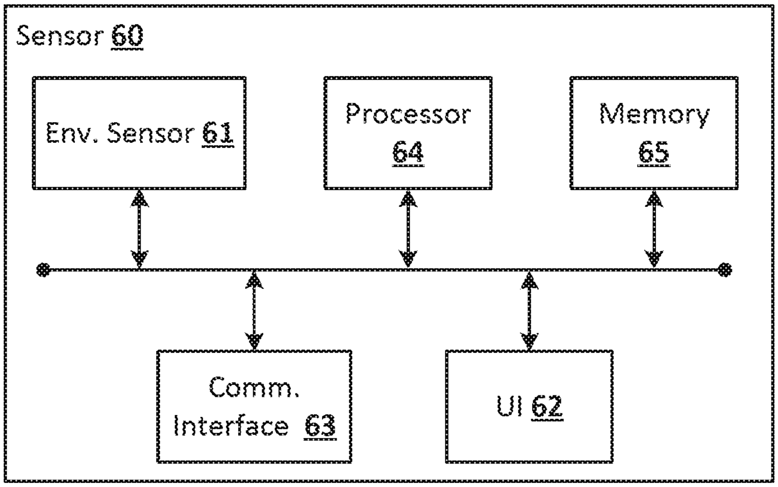
FIG. 5 shows an example sensor according to an implementation of the disclosed subject matter.
Figure 6:
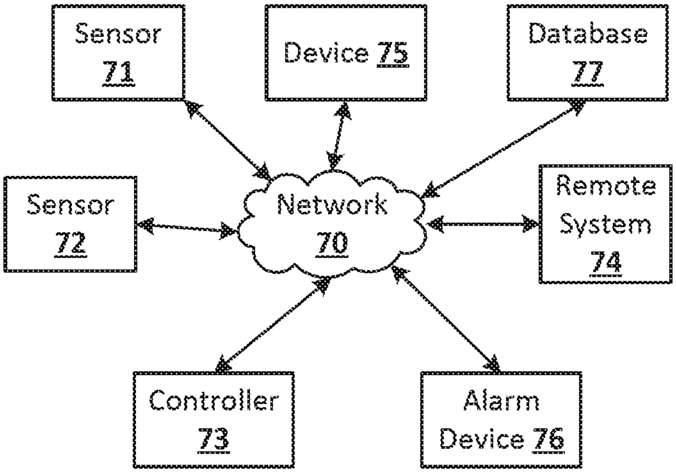
FIG. 6 shows a security system having a sensor network according implementations of the disclosed subject matter.

In some implementations, a processor (e.g., processor 64 of the sensor 60 of FIG. 5 and/or the controller 73, shown in FIG. 6) may determine, based on the database of home-specific sound data (e.g., a database in controller 73 and/or database 77 shown in FIG. 6), whether the at least one sound feature is a human-generated sound. As discussed in detail in connection with FIGS. 2-3, the method may determine, with a second classifier (e.g., second classifier 250 of FIG. 2) that uses a mixture of sound categories obtained from the first classifier (e.g., first classifier 200 of FIG. 2), a degree of confidence that the sound data is from a sound event that is human-generated.

The second classifier (e.g., second classifier 250 of FIG. 2) that uses the mixture of sound categories obtained from the first classifier (e.g., first classifier 200) may determine a degree of confidence that the sound data is from a sound event that is pet-generated. This is discussed in detail below in connection with FIGS. 2-3.

The second classifier may be unique to a particular home. Classifying the sound data can include, for example, assigning at least one sound feature to a sound category based on probability estimates of the at least one sound feature. The human-generated sounds may include phonemes. Phonemes are a basic unit of a language's phonology (i.e., the systematic organization of sounds in a language), which are combined with other phonemes to form meaningful units. Phonology may describe the way sounds function within a given language or across languages to encode meaning. In some implementations of the disclosed subject matter, phonemes may be determined as sound features from an input audio signal, and may be classified.

A cepstrum may be the result of taking an Inverse Fourier Transform (IFT) of a logarithm of an estimated spectrum of a signal. The cepstrum may include information about rate of change in the different spectrum bands. The information about the rate of change in the different spectrum bands may be used to identify features.

The spectrum of the signal may be estimated and/or determined from an input audio signal. The spectrum and/or portions of the spectrum may be selected as one or more sound features, and may be categorized.

In some implementations, the method may include deriving the categories to which the at least one sound feature is categorized by using a dataset of sound events collected from homes, extracting the probability estimates of the at least one sound feature, and using the probability estimates to derive at least one model for a predetermined number of categories. The models may be derived using an unsupervised algorithm and/or a mixture of Gaussians.

With unsupervised algorithms, a user may not be involved in labeling, tagging, and/or categorizing a sound event. For example, a neural network and/or auto-encoder may be used to determine categories for the sound features. In the neural network example, a neural network for sound recognition may be defined by a set of input neurons which may be activated by the sounds of an input audio signal. After being weighted and transformed by a function, the activations of these neurons may be passed on to other neurons. This process may be repeated until an output neuron is activated, which may determine one or more categories for a sound feature included in the input audio signal.

The mixture of Gaussians may be a probabilistic model to represent the presence of subpopulations of categories within an overall population of categories, without requiring an observed data set to identify the sub-population of categories to which an individual observation belongs. A mixture model corresponds to the mixture distribution that represents the probability distribution of observations in the overall population. That is, the mixture of Gaussians may be used to determine categories for features from an audio input signal.

Figure 3:
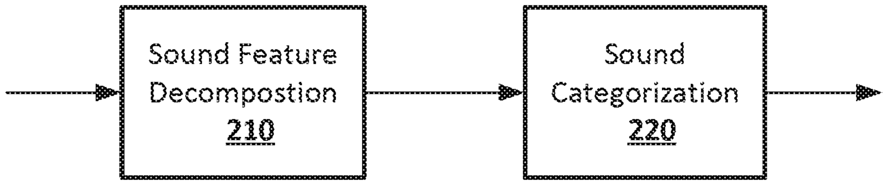
FIG. 3 shows a block diagram of the first classifier of FIG. 2 according to an implementation of the disclosed subject matter.

The method 100 shown in FIG. 1 and disclosed above may be performed by a first classifier 200 that categorizes a sound event into one or more sound categories, and a home-specific second classifier 250 that uses the mixture of the sound categories obtained from the first classifier to determine the degree of confidence that the sound event is human/pet generated, as shown in FIGS. 2-3. The first classifier 200 and the second classifier 250 may be part of processor 64 of sensor 60 shown in FIG. 5, and/or part of controller 73 and/or remote system 74 shown in FIG. 6. Alternatively, the first classifier 200 and/or the second classifier 250 may be one or more processors, controllers, field programmable gate arrays, programmable logic devices, or the like that may be part of the smart home environment as shown, for example, in FIG. 6.

The first classifier 200 may classify a sound event into a particular sound category. A sound event may be decomposed into one or more sound features (e.g., basic sound features) using the sound feature decomposition unit 210, and then may be assigned to one or more categories based on a probability estimates of the basic sound features by the sound categorization unit 220, as shown in FIGS. 2-3. The sound feature decomposition unit 210 and the sound categorization unit 220 may be part of processor 64 of sensor 60 shown in FIG. 5, and/or part of controller 73 and/or remote system 74 shown in FIG. 6, and/or may be one or more separate processors. The basic sound features can include typical sounds heard in homes such as such as human sounds (e.g., speech, cough, laugh, scream, cry, child/baby sounds, or the like), music, knock, clap, click, bang, thud, tone, siren, phone ring, engine hum, water flowing, scratch, power tool, traffic noise, HVAC noise, refrigerator noise, dishwasher noise, washer and/or dryer noise, wind noise, or the like. Alternatively, fundamental units of sounds such as phonemes, cepstrum, or spectrograms, as described above, may also be used as sound features.

To classify a sound event into one or more sound features (e.g., the basic sound features), the first classifier 200 may be trained, for example, on typical sounds heard in a large number of homes, using one or more supervised or semi-supervised methods, so that a model for each of the sound features is obtained. Data from the remote system 74 shown in FIGS. 6-7 may be used to train the first classifier 200. In some implementations, classifiers based on deep neural networks and/or Gaussian mixture models may be used to model the one or more sound features (e.g., basic sounds features).

Based on the probability estimates of the one or more sound features (e.g., basic sound features), the sound event may be mapped to one or more sound categories. To derive the models for the sound categories, a dataset of sound events collected from a predetermined number of homes may be used. As discussed below in connection with FIGS. 6-7, the remote system 74 may collect a dataset of sound events from a plurality of homes via a network. The probability estimates of the one or more sound features (e.g., basic sound features) may be extracted. The probability estimates may be used to derive models for a prescribed number of categories, N, by using, for example, an unsupervised algorithm such as a K-means algorithm and/or by fitting a mixture of Gaussians.

The K-means algorithm includes clustering to partition n observations into K clusters in which each observation may belong to the cluster with the nearest mean, serving as a prototype of the cluster. This may result in a partitioning of the data space of sounds or features from an audio input signal into particular categories, and/or determining the categories themselves.

As discussed above, the mixture of Gaussians may be a probabilistic model to represent the presence of subpopulations of categories within an overall population of categories. The mixture model may correspond to the mixture distribution that represents the probability distribution of observations of categories in the overall population of categories. The mixture of Gaussians may be used to determine categories for features from an audio input signal.

In some implementations, the K-means algorithm (and/or by fitting a mixture of Gaussians) may provide basic and/or a first level of categorization of features from an audio input signal. A second level of categorization (e.g., a higher level of categorization and/or a more precise level of categorization) may be implemented so as to further categorize the feature. For example, a speech model that recognizes a voice of an authorized user may be used to categorize the feature of an audio input signal. That is, a speech model may be used to determine whether an audio input signal includes features of an authorized user, and, if so, the smart home environment may refrain from transmitting a notification and/or outputting an alarm. If the speech model categorizes a feature of an audio input signal as a voice that is other than that of an authorized user, the smart home environment may transmit a notification and/or output an alarm. In another example, a footstep model may similarly determine whether the features of the detected footsteps from an audio input signal are that of an authorized user (e.g., according to force, time of day, location of detection (to determined entry), and the like).

The second classifier 250 shown in FIG. 2 may take in the sound categories that strongly correspond to a particular sound event and determine the degree of confidence that the sound is human and/or pet generated. The second classifier 250 may be unique to a particular home, as it is based on the sound events learned from that home. In some implementations, the second classifier 250 may determine co-occurrence of sounds. That is, the second classifier 250 may determine whether a first set of sounds occurs with a second set of sounds. When there is co-occurrence of sounds, the degree of confidence can be increased.

With the sound classifier 250, a sound category may correspond to a basic unit of data, formed by categorizing sound events for a dataset into a collection indexed by $\{1, \ldots, V\}$. The with sound category in the collection may be represented by a V-vector w such that $w^v=1$ and $w^u=0$ for $u \neq v$ (i.e., u and v cannot have the same values).

A sound-event mixture within a time interval T may be a collection of N sound categories denoted by $w=(w_1, w_2, \ldots, w_N)$, where $w_n$ is the nth sound category in the mixture.

A dataset may be a collection of M sound-event mixtures denoted by $D=\{w_1, w_2, \ldots, w_M\}$.

Figure 4:
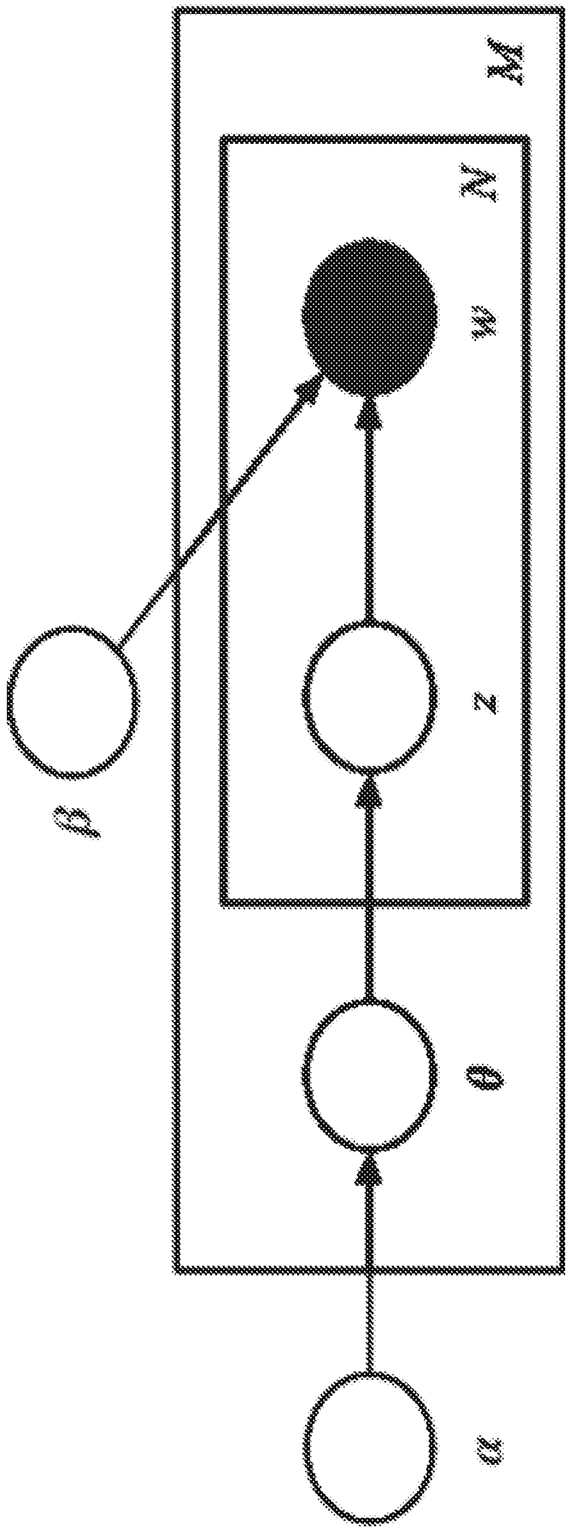
FIG. 4 shows a representation of a Latent Dirichlet Allocation (LDA) of the second classifier of FIG. 2 according to an implementation of the disclosed subject matter.

Such a probabilistic model to categorize sounds may be a latent Dirichlet allocation (LDA) model as shown in FIG. 4, where M denotes the number of sound event mixtures, N is the number of sound categories, $\alpha$ is a parameter of the Dirichlet prior on the per-sound event mixture topic distributions, $\beta$ is the parameter of the Dirichlet prior on the per-topic category distribution, and $\theta$ is the topic distribution. A generative process for sound events may be heard within a time interval T. The generative process may include selecting N to be a Poisson distribution, and selecting $\theta$ as a bivatiate form of the LDA distribution. For each of the N sound categories $w_n$, the generative process may include selecting a sound class $z_n$ (i.e., human or non-human generated) which is approximately Binomial($\theta$), and selecting a sound category $w_n$ from $p(w_n|z_n, \beta)$, a binomial probability conditioned on the sound class $z_n$. The sound-category probabilities are parameterized by a k×V matrix $\beta$ where $\beta_{ij}=p(w^j=1|z^i=1)$. The $\alpha$, $\beta$, $\theta$, and z may be inferred, whereas the sound-event mixture w may be known.

The LDA model may be derived from a dataset of sound-event mixtures D. Using a method of variational inference, approximate Bayes estimates may be derived for the model parameters $\alpha$ and $\beta$, and the posterior distribution $p(\theta, z|w, \alpha, \beta)$. From the derived model, the probability can be computed that (1) a particular sound category, $w_n$, belongs to a particular sound class $z_n$, namely, $p(z_n|w_n)$ and (2) a particular sound-event mixture, $w_n$, belongs to a particular sound class $z_n$, namely, $p(z_n|w)$.

After deriving the probabilistic model, which sound class ($z^{i=1}$ or $z^{i=2}$) corresponds to 'human generated' sounds may be determined. To do this, sound events that strongly correlate to human generated sounds (such as speech, cough, laughter, or the like) may be considered, and their values of $p(z^{i=1}|w)$ and $p(z^{i=2}|w)$ may be compared to identify which of the two classes (i.e., human-generated class and non-human-generated class) these sound events belong to. In general, human-generated sounds usually co-occur together and, therefore, may tend to have higher probability of occurrence in a single class. Non-human-generated sounds may be independent of human presence and may tend to have similar probability of occurrence in both classes. Once it is known which class corresponds to human generated sounds, any given sound mixture w may be classified by computing $p(z^{i=1}|w)$ and $p(z^{i=2}|w)$ and deciding accordingly. This is shown in method 100 of FIG. 1.

The disclosed method 100 is not limited to sound events, but may be extended to events derived from other sensors such as PIR (passive infra-red), motion, and/or image capture sensors (e.g., still images, video, and the like). For example, the sound category $w_n$ can be extended to a more general 'sensor signals category' by incorporating events from other sensors (e.g., sensors 71, 72 of FIG. 6) and, correspondingly, the sound event mixture, w, can be extended to a 'sensory-event mixture' to include a mixture of sound categories from a plurality of sensors.

As discussed below in connection with FIGS. 5-6, the smart home environment may include the first classifier 200 and second classifier 250, and may include sensors 71, 72, which may be PIR, motion, and/or image capture sensors, along with microphones and/or other audio sensors. The controller 73 of the smart home environment may correlate motion activity detected by the motion sensors 71, 72 with audio data from a microphone or other audio sensor 71, 72. That is, the correlation between the motion sensor data and the audio may help train the smart home environment about when audio data may be related to a security event or to typical household activities. Alternatively, or in addition, the controller 73 of the smart home environment may determine that the captured audio may have a strong probability of being related to a human activity.

For example, a sensor 71, 72 may detect a motion activity in a home. One or more other sensors 71, 72 may detect sound such as footsteps, speech or the like. The controller 73 may determine, according to the detected motion activity and the detected sound data, that a human activity is occurring. Depending upon, for example, the time of day the activity is occurring, and whether such activities have been detected before at this time, the controller 73 may transmit a notification and/or activate (or refrain from activating) an alarm.

Implementations of the smart home environment that detects sounds and distinguishes between human-generated, pet-generated, and/or non-human-generated sound events disclosed herein may use one or more sensors. In general, a "sensor" may refer to any device that can obtain information about its environment. Sensors may be described by the type of information they collect. For example, sensor types as disclosed herein may include sound, vibration, motion, smoke, carbon monoxide, proximity, temperature, time, physical orientation, acceleration, location, entry, presence, and the like. A sensor can include, for example, a camera, a retinal camera, and/or a microphone.

A sensor also may be described in terms of the particular physical device that obtains the environmental information. For example, a microphone may obtain sound information, and thus may be used as a general sound sensor. In another example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. In another example, a sensor may operate as a multiple sensor to detect a sound event, as well as a vibration event. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes sound, vibration, movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the implementations disclosed herein.

A sensor may include hardware in addition to the specific physical sensor that obtains information about the environment. FIG. 5 shows an example sensor as disclosed herein.

The sensor 60 may include an environmental sensor 61, such as a sound sensor, vibration sensor, motion sensor, temperature sensor, smoke sensor, carbon monoxide sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. In some implementations, the processor 64 may include the first classifier 200 and the second classifier 250 shown in FIG. 2, and may include the sound feature decomposition unit 210 and/or the sound categorization unit 220 shown in FIG. 3. Processor 64 may include one or more processors, controllers, field programmable gate arrays, programmable logic devices, or the like. The processor 64 may execute instructions stored on a computer-readable memory 65. The memory 65 or another memory in the sensor 60 may also store environmental data obtained by the sensor 61. The environmental data may include, for example, a database of detected sounds. The database may be categorized to include detected human-generated sounds, pet-generated sounds, non-human sounds that have been repeated and are specific to the home, and/or non-human sounds that have been detected that do not have a repetitive frequency, and the like. A communication interface 63, such as a Wi-Fi or other wireless interface, Ethernet or other local network interface, or the like may allow for communication by the sensor 60 with other devices.

A user interface (UI) 62 may provide information (e.g., via a display device or the like) and/or receive input from a user of the sensor. The UI 62 may include, for example, a speaker to output an audible alarm and/or message when an event is detected by the sensor 60. The speaker may output, for example, a message regarding the detection of a human-generated sound from a portion of the home that may be different from where the user is located. The speaker may output a message to an authorized user regarding the operational status (e.g., there are no security and/or environmental events, an operational issue has been detected, and/or a security event and/or environmental event has been detected) of the security system disclosed herein, when, for example, the user arrives at the building (e.g., the user's home, the user's office, or the like), or when the user exits the building. The speaker may output an audible message for a user to access information regarding the operational status of the security system, for example, when the user arrives at the building (e.g., a home, an office, or the like) via an application installed and/or accessible from an electronic device (e.g., device 75 illustrated in FIG. 6 and/or FIG. 8). Alternatively, or in addition, the UI 62 may include a light to be activated when an event is detected by the sensor 60. The user interface may be relatively minimal, such as a limited-output display, or it may be a full-featured interface such as a touchscreen.

Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. As discussed above, sensors (e.g., which may be the same type or may include different types) may communicate with one another to determine a co-occurrence of a security event.

A central controller may be general- or special-purpose. For example, one type of central controller is a home automation network that collects and analyzes data from one or more sensors within the home. In some implementations, the central controller may include the first classifier 200 and the second classifier 250 shown in FIG. 2, and may include the sound feature decomposition unit 210 and the sound categorization unit 220 of FIG. 3.

Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Faults and/or other issues with sensors may be reported to the central controller. If the communications network that of which the sensors and the central controller are a part experiences connectivity issues, data to authenticate users so as to allow entry, and/or arming and/or disarming of the security system may be stored at individual sensors that may serve as access points to the home and/or building. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 6 shows examples of a security system having a sensor network as disclosed herein, which may be implemented over any suitable wired and/or wireless communication networks. One or more sensors 71, 72 may communicate via a local network 70, such as a Wi-Fi or other suitable network, with each other and/or with a controller 73.

FIG. 6 shows an example of a security system and/or smart-home network as disclosed herein, which may be implemented over any suitable wired and/or wireless communication networks. One or more sensors 71, 72 may communicate via a local network 70, such as a Wi-Fi or other suitable network, with each other and/or with a controller 73. The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use.

The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In implementations of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The controller 73 shown in FIG. 6 may be communicatively coupled to the network 70 and may be and/or include a processor. Alternatively, or in addition, the controller 73 may be a general- or special-purpose computer. In some implementations, the controller 73 may include one or more processors, which may include the first classifier 200 and the second classifier 250 shown in FIG. 2, and may include the sound feature decomposition unit 210 and the sound categorization unit 220 shown in FIG. 3. The controller 73 may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors 71, 72 may communicate directly with a remote system 74. The remote system 74 may, for example, aggregate data from multiple locations, provide instruction, software updates, and/or aggregated data to a controller 73 and/or sensors 71, 72.

The controller 73 may include a database of typical pet and/or human sounds, phonemes, cepstrum, spectrograms, and/or home-specific sounds (e.g., sounds that may be specific to the home and may be learned by the smart home environment over time). Alternatively, or in addition, the smart home environment shown in FIG. 6 may include a database 77, which may include the typical pet and/or human sounds, phonemes, cepstrum, spectrograms, and/or home-specific sounds.

The sensor network shown in FIG. 6 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart-home environment can control and/or be coupled to devices outside of the structure. For example, one or more of the sensors 71, 72 may be located outside the structure, for example, at one or more distances from the structure (e.g., sensors 71, 72) may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 6 may include a plurality of devices, including intelligent, multi-sensing, network-connected devices, which can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 6.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 6, and the controller 73 may control the HVAC system (not shown) of the structure. The sensors 71, 72 may be sound sensors that detect the operational sounds of the HVAC system, and the smart home environment may learn that such sounds are not security events. That is, when the sensors 71, 72 detect HVAC sounds, the controller 73 may refrain from transmitting notifications to a user and from outputting an alarm.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 6, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73. Sound sensors 71, 72 may detect the approach or departure of a person from a location, and the controller 73 may transmit a notification to a user regarding the approach or departure.

In some implementations, the smart-home environment of the sensor network shown in FIG. 6 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 6. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown). The sensors 71, 72 may detect the sound of the operation of switches, the turning on or off of the fan, and adjusting the power and/or speed of the fan. The smart home environment may learn that such detected sounds are human-generated sounds.

In implementations of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 6. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. The sensors 71, 72 and/or controller 73 may determine the co-occurrence of a detection from a motion sensor and/or camera on a window or door, and a sound sensor which may detect the breaking of glass or other noise associated with a forced entry. When the co-occurrence is determined, the controller 73 may transmit a notification to a user and/or activate an alarm.

In some implementations of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 6 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment. The sensors 71, 72 may be sound sensors, and detect the sound of the movement of the doorknob. The controller 73 may determine the co-occurrence of the sensors 71, 72 coupled to the doorknob that detect its movement, along with the detected sound of the doorknob moving.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 6 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, smart watch, wearable computing device, a tablet, a key FOB, a radio frequency and the like). A webpage or application can be configured to receive communications from the user and control the one or more of the network-connected smart devices based on the communications and/or to present information about the device's operation to the user. For example, the user can view the webpage and/or the application, and can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device (e.g., device 75 shown in FIG. 6) and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some implementations including sensors used by or within the smart-home environment. The smart-home environment may provide notifications to users when there is an attempt to use network-connected smart devices in a manner that is atypical from the learned pattern of usage.

In the implementations of the disclosed subject matter, the smart-home environment may learn which sounds detected by sensors 71, 72 are human-generated, pet-generated, and/or are non-human generated. The smart home environment may learn which detected sounds repeatedly occur (e.g., HVAC sounds, traffic noise from a nearby road, rain against the window, wind that rattles a window, or the like) and/or are specific to the home. In the embodiments of the disclosed subject matter, when the sound detected by the sensors 71, 72 is human-generated sound that is at an atypical time, the controller 73 may transmit a notification to the user and/or output an alarm. The notification may allow the user to receive other sensor data (e.g., video data, image data, or the like) with, for example device 75, to determine whether to output an alarm, contact emergency services and/or law enforcement, or the like.

Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event any of the network-connected smart devices, such as motion sensors and/or sound sensors, detect movement at night time, the controller 73 and/or remote system 74 can activate the outdoor lighting system and/or other lights in the smart-home environment.

The one or more sensors 71, 72 shown in FIG. 6 may be magnetic field sensors that detect a security event when a door and/or window of a building having the security system disclosed herein has been opened and/or compromised. There may be a co-occurrence with an event detected by the magnetic field sensors and a sound detected with the sound sensors 71, 72 to increase the accuracy as to whether the determination that the detected event is a security event that should trigger a notification and/or alarm. In yet another example, the one or more sensors 71, 72 may be a smoke sensor and/or a carbon monoxide sensor that detect an environmental event when smoke is sensed and/or carbon monoxide is sensed.

In implementations of the disclosed subject matter, the remote system 74 shown in FIG. 6 may be a law enforcement provider system, a home security provider system, a medical provider system, and/or a fire department provider system. When a security event and/or environmental event is detected by at least one of one sensors 71, 72, a message may be transmitted to the remote system 74. The content of the message may be according to the type of security event and/or environmental event detected by the sensors 71, 72. For example, if smoke is detected by one of the sensors 71, 72, the controller 73 may transmit a message to the remote system 74 associated with a fire department to provide assistance with a smoke and/or fire event (e.g., request fire department response to the smoke and/or fire event). Alternatively, the sensors 71, 72 may generate and transmit the message to the remote system 74. In another example, when one of the sensors 71, 72 detects a security event, such a window or door of a building being compromised, a message may be transmitted to the remote system 74 associated with local law enforcement to provide assistance with the security event (e.g., request a police department response to the security event).

The controller 73 and/or the remote system 74 may include a display to present an operational status message (e.g., a security event, an environmental event, an operational condition, or the like), according to information received from at least one or the sensors 71, 72. For example, the display of the controller 73 and/or remote system 74 may display the operational status message to a user while the user is away from the building having the security system disclosed herein. Alternatively, or in addition, the controller 73 may display the operational status message to a user when the user arrives at and/or departs (i.e., exits) from the building. For example, one or more sensors may identify and authenticate the user (e.g., using images captured by the sensor, and comparing them with pre-stored images, and/or according to identifying information from the device of a user, such as a smartphone, smart watch, wearable computing device, key FOB, RFID tag, or the like), and the security system may display the operational status message.

FIG. 6 shows a security system as disclosed herein that includes an alarm device 76, which may include a light and an audio output device. The alarm device 76 may be controlled, for example, by controller 73. The light of the alarm device 76 may be activated so as to be turned on when one or more sensors 71, 72 detect a security event and/or an environmental event. Alternatively, or in addition, the light may be turned on and off in a pattern (e.g., where the light is turned on for one second, and off for one second; where the light is turned on for two seconds, and off for one second, and the like) when one or more sensors 71, 72 detect a security event and/or an environmental event. Alternatively, or in addition, an audio output device of the alarm device 76 may include at least a speaker to output an audible alarm when a security event and/or an environmental event is detected by the one or more sensors 71, 72. For example, a security event may be when one or more sensors 71, 72 are motion sensors that detect motion either inside a building having the security system disclosed herein, or within a predetermined proximity to the building. The speaker of the alarm device 76 may, for example, output a message when the user arrives at the building or departs from the building according to the operational status of the security system (e.g., a security and/or environmental event has been detected, an operational issue with the security system has been detected, the security system has been armed and/or disarmed, or the like).

Figure 8:
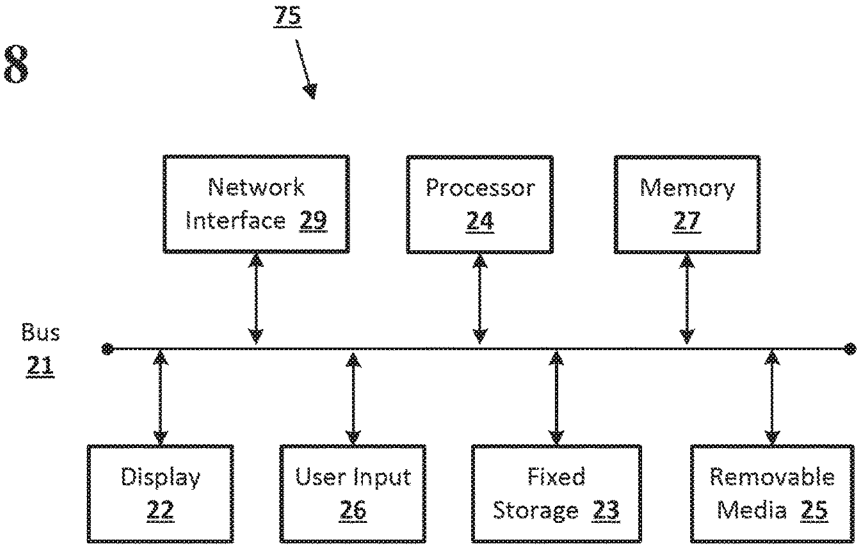
FIG. 8 shows an electronic device according to implementations of the disclosed subject matter.

FIG. 6 shows a device 75 that may be communicatively coupled to a sensor. Although FIG. 6 illustrates that device 75 is coupled to sensor 72, the device 75 may be communicatively coupled to sensor 71 and/or sensor 72. The device 75 may be a computing device as shown in FIG. 8 and described below, and/or a key FOB. A user of the security system disclosed herein may control the device 75. When the device 75 is within a predetermined distance (e.g., one foot, five feet, 10 feet, 20 feet, 100 feet, or the like) from the sensor 71, 72, the device 75 and the sensor 71, 72 may communicate with one another via Bluetooth signals, Bluetooth Low Energy (BTLE) signals, Wi-Fi pairing signals, near field communication (NFC) signals, radio frequency (RF) signals, infra-red signals, and/or short-range communication protocol signals. For example, the user may present the device 75 within the predetermined distance range of the sensor so that the device 75 and the sensor may communicate with one another. The device 75 may provide identifying information to the sensor 72, which may be provided to the controller 73 to determine whether the device 75 belongs to an authorized user of the security system disclosed herein. The controller 73 may monitor the location of the device 75 in order to determine whether to arm or disarm the alarm device 76. The controller 73 may arm or disarm the alarm device 76 according to, for example, whether the device 75 is within a home, building, and/or a predetermined area. The predetermined area may be defined, for example, according to, for example, geo-fencing data, placement and/or range of sensors 71, 72, a defined distance from the building having the security system disclosed herein, and the like.

In example implementations of the disclosed subject matter, the device 75 may be associated with an authorized user. Authorized users may be those users, for example, who have identifying information stored and/or registered with the controller 73. Identifying information may include, for example, images of the user, voice recordings of the user, identification codes that are stored in a user's device, user PIN codes, and the like.

For example, when the authorized user and the device 75 are outside of the home, building, and/or predetermined area, the controller 73 may arm the alarm device 76. In determining whether to arm the alarm device 76, the controller may gather data from the sensors 71, 72, to determine whether any other person is in the building. When the alarm device 76 is armed, and the user and the device 75 return to the home, building, and/or predetermined area of the security system, the controller 73 may disarm the alarm device 76 according to the signals received by the sensors 71, 72 from the device 75. The exchanged signals may include the identifying information of the user.

In FIG. 6, the sensor 71, 72 may be a camera to capture an image of a face of a person to be transmitted to the controller 73, where the controller 73 compares the captured facial image with a pre-stored image. When it is determined by the controller 73 that at least a portion of the captured facial image matches the pre-stored image, the controller 73 determines that the person is an authorized user of the security system disclosed herein. The controller 73 may arm or disarm the alarm device 76 according to the determination of whether the person is an authorized user.

The sensor 71, 72 may be a camera to capture a retinal image from a person to be transmitted to the controller 73, where the controller 73 compares the captured retinal image with a pre-stored image. When it is determined by the controller 73 that at least a portion of the captured retinal image matches the pre-stored image, the controller 73 determines that the person is an authorized user of the security system disclosed herein. The controller 73 may arm or disarm the alarm device 76 according to the determination of whether the person is an authorized user.

The sensor 71, 72 may be a microphone to capture a voice of a person to be transmitted to the controller 73, where the controller 73 compares the captured voice with a pre-stored voice. When it is determined by the controller 73 that at least a portion of the captured voice matches the pre-stored voice, the controller 73 determines that the person is an authorized user of the security system disclosed herein.

When the sensor 72 and/or the controller 73 determine that the device 75 is associated with an authorized user according to the transmitted identification information, the sensor 72 and/or the controller 73 provide an operational status message to the user via a speaker (not shown), a display (e.g., where the display is coupled to the controller 73 and/or remote system 74), and/or the device 75. The operational status message displayed can include, for example, a message that a security event and/or environmental event has occurred. When the sensors 71, 72 have not detected a security and/or environmental event, a message may be displayed that no security and/or environmental event has occurred. In implementations of the subject matter disclosed herein, the device 75 may display a source of the security event and/or environmental event, a type of the security event and/or environmental event, a time of the security event and/or environmental event, and a location of the security event and/or environmental event.

In implementations of the disclosed subject matter, the device 75 may be communicatively coupled to the network 70 so as to exchange data, information, and/or messages with the sensors 71, 72, the controller 73, and the remote system 74.

In implementations of the disclosed subject matter, the controller 73 can request entry of an access code from the device 75 and/or a keypad communicatively coupled to the controller 73. In some implementation, the access code may be a retina scan image, voice data, or the like which may be transmitted to and authenticated by the controller 73. Upon receipt of the access code, the security system disclosed herein may be disarmed, and/or may provide an operational status message to the user via a display coupled to the controller 73 and/or the device 75. Alternatively, or in addition, an operational status message may be output via a speaker of the alarm device 76.

For example, a preset time (e.g., 15 seconds, 30 seconds, 1 minute, 5 minutes, or the like) may be set for the security system to allow for a user to exit the home or building before arming the alarm device 76. A preset time may be set for the security system to allow for a user to enter the home and disarm the alarm device 76. The preset time for entry of the home and the preset time to exit the home may be the same amount of time, or can be set to provide different amounts of time. If a user needs more time to enter or exit the home with the security system, an electronic device of the user (e.g., a smartphone, smart watch, wearable computing device, radio frequency identification (RFID) tag, fitness band or sensor, a key FOB, or the like, such as device 75)

can request, upon receiving input from the user, that the controller 73 provide additional time beyond the preset time to allow for the user to enter or exit the home. Alternatively, or in addition, the security system disclosed herein may extend the preset time to enter or exit. For example, the time may be extended for exiting the home while the user and/or the user's electronic device are in the home. That is, the sensors 71, 72 may determine that the user and/or the user's registered electronic device are in the home and are engaged in moving towards exiting, and the controller 73 may extend the preset time to exit. Alternatively, or in addition, the device 75 may transmit a command (e.g., when input is received from the user) to the controller 73 to disengage the exit process (e.g., the controller 73 and/or the alarm device 76 are disengaged from counting down the preset time before arming the alarm device 76).

In another example, when the user returns home, a preset time for entry to disarm the alarm device 76 may be extended according to whether the user has an electronic device (e.g., device 75, which may be a smartphone, smart watch, wearable computing device, RFID tag, fitness band or sensor, key FOB, or the like) that is registered with the controller 73. That is, the sensors, 71, 72 may detect the presence of the device 75 with the user, and may disarm the alarm device 76. When the sensors 71, 72 determine that the user does not have the device 75, the controller 73 may extend the preset time so that a user may be given additional time to enter a code on, for example, a keypad communicatively coupled to the controller 73, to disarm the alarm device 76.

As illustrated in FIG. 6, a security system can include sensors (e.g., sensors 71, 72) to detect a location of at least one user, and generate detection data according to the detected location of at least one user of the security system. The detection data may be generated by the sensors 71, 72. For example, the at least one user may be one or more members of a household, and the security system may monitor their location using the sensors 71, 72 to determine whether to arm or disarm the alarm device 76. In some implementations, different types of sensors 71, 72 may be used to determine the location of people within a home. For example, the co-occurrence of motion data and sound data from sensors 71, 72 may be used to determine the location of a particular person. A processor, such as the controller 73 illustrated in FIG. 6 and described above, may be communicatively coupled to the sensors 71, 72, and can receive the detection data. The controller 73 can determine whether the at least one user is occupying a home, building, and/or within a predetermined area according to the detection data. The predetermined area may be set according to the boundaries of a home or building, geofencing data, motion data, a door position event, a distance from one or more sensors, and the like.

In determining the location of a user, the sensors 71, 72 can detect the location of one or more electronic devices (e.g., device 75) associated with a user. The one or more devices may be registered with the controller 73 and/or the remote system 74. As discussed above, sensors 71, 72 may communicate with another via Bluetooth signals, Bluetooth Low Energy (BTLE) signals, Wi-Fi pairing signals, near field communication (NFC) signals, radio frequency (RF) signals, infra-red signals, and/or short-range communication protocol signals. The device 75 may provide identifying information to the sensor 71, 72, which may be provided to the controller 73 and/or the remote system 74 to determine whether the device 75 belongs to an authorized user of the security system disclosed herein. When the controller 73 and/or the remote system 74 determine that the device is an authorized device of the user, the controller 73 and/or the remote system 74 may determine the location of the device 75.

The sensors 71, 72 may be used determine whether the user associated with the device 75 can be identified with the device. For example, the sensors 71, 72 can determine whether an authorized user has a physical presence with the registered device (e.g., device 75), or whether an unauthorized person has possession of an authorized device. For example, as discussed above, a sensor 71, 72 having a camera can capture an image to determine if an authorized user has possession of the located device 75. In another example, the sensor 71, 72 may be a microphone and/or sound sensor to capture voice data to determine if an authorized user has possession of the device 75.

Alternatively, or in addition, the controller 73 and/or remote system 74, using the sensors 71, 72, may determine whether the located device 75 has been lost or mislaid, has been left at home while the user is out of the home, or is in the possession of an unauthorized user. When it is determined that the device 75 is lost, mislaid, or in the possession of an unauthorized user, a message may be sent to, for example, an application accessible by the user to notify them of the location of the lost or mislaid device 75, or alert them to the possession of their device 75 by an unauthorized user.

In some implementations, the sensors 71, 72 can detect a location of the user is outside of the home, building, and/or predetermined area, and that a user's first electronic device (e.g., a smartphone, smart watch, wearable computing device, or the like) is within the home, building, and/or predetermined area. The controller 73 can determine whether to arm the alarm device 76 according one a location of a user's second electronic device (e.g., a key FOB, RFID tag, fitness band or sensor, or the like), geofencing data, and the detection data from the sensors 71, 72.

The security system disclosed herein includes an alarm device, such as the alarm device 76 illustrated in FIG. 6 and discussed above, which can be armed or disarmed by the controller 73 according to the determination as to whether the at least one user is occupying the home or building, and/or within the predetermined area.

For example, if the controller 73 determines that the members of a household (e.g., the users of the home security system) have exited the house (e.g., are no longer occupying the home or building according to the data from sensors 71, 72, and are outside of the predetermined area), the controller 73 may arm the alarm device 76. After exiting, controller 73 may request confirmation from the user, via the device 75, to arm the alarm. The sensors 71, 72 may determine the location of the members of the household according to their respective electronic devices (e.g., smartphones, smart watch, wearable computing device, tablet computers, key FOBs, RFID tag, fitness band or sensor, and the like), according to images and/or sounds captured by the sensors, according to the sensors detecting one or more doors opening and closing, and the like.

For example, the sensors 71, 72 may detect one or more doors opening and/or closing, the controller 73 may determine an approximate location of a user, according to the location of the sensor for the door, and what direction the door was opened and/or closed in. The data generated by the door sensors 71, 72 regarding the directional opening of the door, as well as the location of the sensor, may be used along with other sensor data from sensors 71, 72 (e.g., motion data, camera images, sound data, and/or thermal data, and the like) to provide an improved location determination of the user.

The controller 73 may aggregate detection data (e.g., motion data, sound data, and the like) from the sensors 71, 72 and store it in a storage device coupled to the controller 73 or the network 70. Alternatively, or in addition, the aggregate detection data may be stored in the database 77 shown in FIG. 6. In some implementations, the database 77 may store detected sounds, where the sounds may be categorized in to human-generated sounds, pet-generated sounds, and/r non-human generated sounds. The database 77 may store the times in which typical human-generated sounds occur, and the types of detected human- and pet-generated sounds. The database 77 may store sounds that are specific to the home, such as HVAC sounds, noise from a nearby road, rain on a window, wind against a window and/or door, and the like.

The data aggregated by the controller 73 may be used to determine entrance and exit patterns (e.g., what days and times users enter and exit from the house, what doors are used, and the like) of the members of the household, patterns of when members of the household are home, the typical sounds generated by the household (including any pets), and the like. The controller 73 may arm or disarm the alarm device 76 according to the determined patterns, and/or output an alarm when a detected sound is determined to be a security event.

In implementations of the disclosed subject matter, one or more user electronic devices (e.g., device 75) can be registered with the processor, and the at least one of the sensors 71, 72 transmits a location request signal to the device 75. In response to the location request signal, the device 75 can transmits a location signal, and the controller 73 can determine the location of the device 75 according to the received location signal. The location request signal and the location signal can be Bluetooth signals, Bluetooth Low Energy (BTLE) signals, radio frequency (RF) signals, near field communications (NFC) signals, and the like.

The controller 73 can transmit a request message to be displayed by the device 75. The message may be, for example, a reminder to arm or disarm the alarm device 76. Upon displaying the message the electronic device receives input to arm or disarm the alarm device 76 according to the displayed request message, and transmits the received input to the controller 73 so as to control the alarm device 76. For example, the controller can request a code from the user to either arm or disarm the alarm device 76. When the user provides the code to the device 75, which correspondingly transmits the entered code to the controller 73, the controller 73 may control the arming or disarming of the alarm device 76. Alternatively, or in addition, the controller 73 can control the alarm device 76 to be automatically armed when the user is no longer occupying the home or building, and/or is outside of the predetermined area. Alternatively, or in addition, the controller may control the arming or disarming of the alarm device 76 according to a code that entered in a keypad that is communicatively coupled to the controller 73.

In implementations of the disclosed subject matter, authentication requirements for arming or disarming of the alarm device 76 may be reduced when a device 75 is used to arm or disarm, and the device 75 is a registered device. When a button on the registered device 75 or displayed by the device 75 is used to arm or disarm the alarm device 76, the user may not have to enter a code, a shortened PIN code, a voice code, or the like.

When the sensors 71, 72 for an entry door to the home or building become disconnected from the network 70 and the controller 73, and the alarm device 76 is armed, the user may still re-enter the home. The security system may learn which doors are used by the user to enter and/or exit a home. The sensors 71, 72 associated with the doors that are used to enter and/or exit the home may store identifying information, so that the user may present a device 75 to the sensors 71, 72 to exchange identifying information to allow the user to enter the door. Once the user enters, the user may manually disarm the alarm device 76 by entering a security code.

The security system may learn the how the user typically arms and disarms the alarm device 76 (e.g., using a keypad, using the device 75, allowing for auto-arming, or the like). The device 75 may receive a message from the controller 73 when there is an attempt to disarm the alarm device 76 at a time of day and/or in a manner that is inconsistent with a user history or pattern for disarming. The controller 73 may request that the user of device 75 confirm whether the disarming is authorized, and may provide information from sensors 71, 72 (e.g., images captured of the person attempting the disarming) to assist in the confirmation. Via the device 75, the user may confirm or deny the request by the controller 73 to disarm the alarm device In implementations of the disclosed subject matter, the alarm device 76 can be armed or disarmed by the controller 73 according to geo-location data from the sensors 71, 72 and/or the device 75. For example, if the sensors 71, 72 determine that the device 75 is physically located with an authorized user (e.g., as discussed above) according to geo-location data received from the device 75, and the user has exited the home and there are no other users in the home according to the sensors 71, 72, the controller 73 can automatically arm the alarm device. Alternatively, the controller may transmit a request message to the device 75 to determine if the user would like to arm the alarm device 76. For example, the message may display a selectable button to arm or disarm the alarm device 76. In another example, one or more sensors 71, 72 may determine the geo-location of an authorized user who is exiting the home, and may determine that one or more users are still located in the home according to geo-location data, and the controller 73 may refrain from arming the alarm device 76 to allow for the one or more users still in the home to exit. In yet another example, the sensors 71, 72 may determine the geo-location of an authorized user who has exited the home, and determine that one or more users are still located within the home, and the controller 73 may automatically arm the alarm device 76 to activate an audio and/or visual alarm when a defined outer perimeter is breached by an unauthorized user or when a door leading outside of the home is opened, but may not activate the alarm when doors internal to the home are opened or closed. In another example, the sensors 71, 72 may determine that, as there is an absence of human-generated sounds, the authorized user has exited. Motion sensors 71, 72 may confirm the exit of the user, and/or confirm that no human motion is presently being detected in the home.

In some implementations, the alarm device 76 can be armed or disarmed when the controller 73 determines that the device 75 and/or sensors 71, 72 are disconnected from the communications network 70 coupled to the alarm device 76. For example, if device 75 and/or sensors 71, 72 are disconnected from the network 70 so as to be decoupled from the controller 73 and/or remote system 74, the controller 73 may arm the alarm device 76. That is, the network 70 may be a wireless network having a predetermined communicative range within and/or around the perimeter of a house or building. When an authorized device 75 becomes decoupled from the network 70 (e.g., because the device 75 is outside of the predetermined communicative range) and/or the sensors 71, 72 become decoupled from the network 70, the controller 73 may automatically arm the alarm device 76.

In the security system disclosed herein, sensors 71, 72 can detect a security event, such as a door event (e.g., where a door to a house is opened, closed, and/or compromised) or a window event (e.g., where a window of a house is opened, closed, and/or compromised). For example, the sensors 71, 72 may have an accelerometer that identifies the force on the door or window as a compromising event. In another example, the sensors 71, 72 may contain an accelerometer and/or compass, and the compromising event may dislodge the sensor from the door or window, and the motion of the sensor 71, 72 may identify the motion as a compromising event. The sensors 71, 72 may be sound sensors and/or microphones to detect the sound of a door or window opening. The controller 73 may activate the alarm device 76 according to whether the detected door event or window event is from an outside location (e.g., outside the house, building, or the like). That is, the controller 73 may control the alarm device 76 to output an audible alarm and/or message via a speaker when a door event or window event is detected by the sensors 71, 72. In some implementations, the controller 73 may transmit a notification to device 75. A light of the alarm device 76 may be activated so as to be turned on when one or more sensors 71, 72 detect a security event, such as a door or window event. Alternatively, or in addition, a light may be turned on and off in a pattern (e.g., where the light is turned on for one second, and off for one second; where the light is turned on for two seconds, and off for one second, and the like) when one or more sensors 71, 72 detect a security event such as the window and/or door event.

The controller 73 can control the alarm device 76 to be armed or disarmed according to a preset time period for a user to enter or exit a home or building associated with the security system. The predetermined time can be adjusted by the controller 73 according to the user. For example, as discussed herein, the controller 73 can aggregate data from the sensors 71, 72 to determine when a user enters and exits the home (e.g., the days and times for entry and exit, the doors associated with the entry and exit, and the like). For example, the controller 73 can adjust the amount of time for arming the alarm device 76 to be longer or shorter, according to the amount of time the user takes to exit the house according to the aggregated data.

In the security system disclosed herein the at least one sensor determines that the user is not occupying the home or building, and/or is outside of the predetermined area for a time greater than a preset time, the controller 73 can control the alarm device 76 to transition from a first security mode to a second security mode. The second security mode may provide a higher level of security than the first security mode. For example, the second security mode may be a "vacation" mode, where the user of the security system disclosed herein (e.g., the members of a household) are away from the house for a period of time (e.g., 1 day, 3 days, 5 days, 1 week, 2 weeks, 1 month, or the like). As discussed herein, the controller 73 may aggregate the detection data received from the sensors 71, 72 over a preset time (e.g., 1 week, 1 month, 6 months, 1 year, or the like) to determine a pattern for when the user is within the predetermined location or not.

Figure 7:
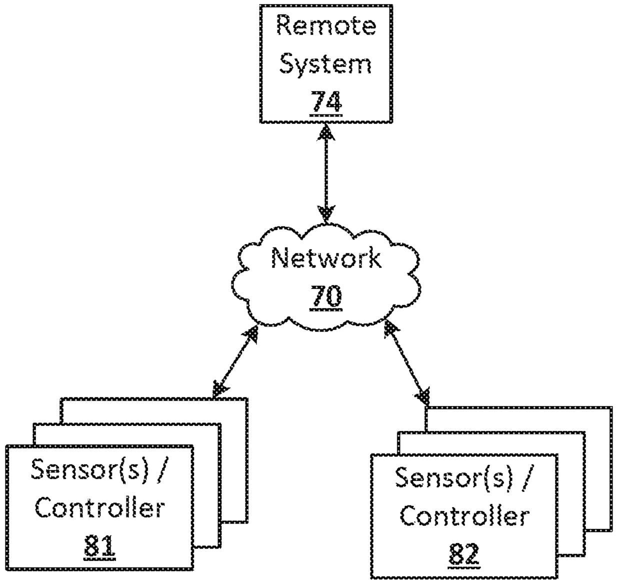
FIG. 7 shows a remote system to aggregate data from multiple locations having security systems according to an implementation of the disclosed subject matter.

In some configurations, as illustrated in FIG. 7, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 6 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In some implementations, the remote system 74 may aggregate data from sound sensors 71, 72 from different homes to update the database 77 and/or the first classifier 200. That is, the sound events that are general across homes may be accessible and considered by the first classifier 200.

The remote system 74 may gather and/or aggregate security event and/or environmental event data from systems 81, 82, which may be geographically proximally located to the security system illustrated in FIG. 6. The systems 81, 82 may be located within one-half mile, one mile, five miles, ten miles, 20 miles, 50 miles, or any other suitable distance from the security system of a user, such as the security system shown in FIG. 6. The remote system 74 may provide at least a portion of the gathered and/or aggregated data to the controller 73, the device 75, and/or the database 77 illustrated in FIG. 6.

The user of the device 75 may receive information from the controller 73 and/or the remote system 74 regarding a security event that is geographically proximally located to the user of the device 75 and/or the security system of a building (e.g., a home, office, or the like) associated with the user. Alternatively, or in addition, an application executed by the device 75 may provide a display of information from systems 81, 82, and/or from the remote system 74.

For example, an unauthorized entry to a building associated with systems 81, 82 may occur, where the building is within one-half mile from the building associated with the user of the device 75. The controller 73 and/or the remote system 74 may transmit a message (e.g., a security alert message) to the device 75 that an unauthorized entry has occurred in a nearby building, thus alerting the user to security concerns and/or potential security threats regarding their geographically proximally located building.

In another example, a smoke and/or fire event of a building associated with systems 81, 82 may occur, where the building is within 500 feet from the building associated with the user of the device 75. The controller 73 and/or the remote system 74 may transmit a message (e.g., a hazard alert message) to the device 75 that the smoke and/or fire event has occurred in a nearby building, thus alerting the user to safety concerns, as well as potential smoke and/or fire damage to their geographically proximally located building.

In situations in which the systems discussed here collect personal information about users, or may make use of personal information, the users may be provided with an opportunity to control whether programs or features collect user information (e.g., a user's current location, a location of the user's house or business, or the like), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Implementations of the presently disclosed subject matter may be implemented in and used with a variety of computing devices. FIG. 8 is an example computing device 75 suitable for implementing implementations of the presently disclosed subject matter. The device 75 may be used to implement a controller, a device including sensors as disclosed herein, or the like. Alternatively or in addition, the device 75 may be, for example, a desktop or laptop computer, or a mobile computing device such as a smart phone, smart watch, wearable computing device, tablet, key FOB, RFID tag, fitness band or sensor, or the like. The device 75 may include a bus 21 which interconnects major components of the device 75, such as a central processor 24, a memory 27 such as Random Access Memory (RAM), Read Only Memory (ROM), flash RAM, or the like, a user display 22 such as a display screen and/or lights (e.g., green, yellow, and red lights, such as light emitting diodes (LEDs) to provide the operational status of the security system to the user, as discussed above), a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the device 75 are generally stored on and accessed via a computer readable storage medium.

The fixed storage 23 may be integral with the device 75 or may be separate and accessed through other interfaces. The network interface 29 may provide a direct connection to a remote server via a wired or wireless connection. The network interface 29 may provide a communications link with the network 70, sensors 71, 72, controller 73, and/or the remote system 74 as illustrated in FIG. 6. The network interface 29 may provide such connection using any suitable technique and protocol as will be readily understood by one of skill in the art, including digital cellular telephone, radio frequency (RF), Wi-Fi, Bluetooth®. Bluetooth Low Energy (BTLE), near-field communications (NFC), and the like. For example, the network interface 29 may allow the device to communicate with other computers via one or more local, wide-area, or other communication networks, as described in further detail herein.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:

detecting, by a sensor of a home security system, a sound event;

selecting, by a processor of the home security system that is communicatively coupled to the sensor, at least a portion of sound data captured by the sensor that corresponds to at least one sound feature of the detected sound event;

determining, by the processor, whether the at least one sound feature correlates to an unauthorized entry based upon home-specific sound data of the home security system including information regarding at least one feature selected from a list consisting of: a room size, a reverberation, and a distance between the sensor and a source of the at least the portion of sound data captured by the sensor as determined by the processor of the home security system; and transmitting, by a communications interface coupled to the processor, a notification to a computing device when the at least one sound feature correlates to the unauthorized entry.

2. The method of claim 1, wherein the determining whether the at least one sound feature correlates to the unauthorized entry comprises:

determining whether the at least one sound feature is a human-generated sound.

3. The method of claim 1, wherein the determining whether the at least one sound feature correlates to the unauthorized entry comprises:

determining, whether the at least one sound feature is pet-generated.

4. The method of claim 1, further comprising:

categorizing the at least one sound feature by:

using a dataset of sound events collected from homes;

extracting probability estimates of the at least one sound feature; and using the probability estimates to derive at least one model for a predetermined number of categories.

5. The method of claim 4, wherein the models are derived using at least one of the group consisting of: an unsupervised algorithm and a mixture of Gaussians.

6. The method of claim 1, wherein the notification is transmitted to at least one from the group consisting of: a law enforcement provider system, a home security provider system, a medical provider system, and a fire department provider system.

7. The method of claim 1, wherein the determining whether the at least one sound feature correlates to the unauthorized entry comprises:

determining, using at least one other sensor, a co-occurrence of the detected sound event using data generated by the at least one other sensor.

8. A home security system comprising:

a sensor to detect a sound event;

a processor coupled to the sensor to:

select at least a portion of sound data captured by the sensor that corresponds to at least one sound feature of the detected sound event;

determine, whether the at least one sound feature correlates to an unauthorized entry based upon home-specific sound data of the home security system that includes information regarding at least one feature selected from a list consisting of:

a room size, a reverberation, and a distance between the sensor and a source of the at least the portion of sound data captured by the sensor as determined by the processor of the home security system; and a communications interface, coupled to the processor, to transmit a notification to a computing device when the at least one sound feature correlates to an unauthorized entry.

9. The system of claim 8, wherein the processor determines that the at least the portion of sound data is from a sound event that is human-generated.

10. The system of claim 8, wherein the processor determines that the at least the portion of sound data is from a sound event that is pet-generated.

11. The system of claim 8, wherein the processor categorizes the at least one sound feature by using a dataset of sound events collected from homes, and extracts probability estimates of the at least one sound feature, and uses the probability estimates to derive at least one model for a predetermined number of categories.

12. The system of claim 11, wherein the models are derived using at least one of group consisting of: an unsupervised algorithm, and a mixture of Gaussians.

13. The system of claim 8, wherein the communications interface transmits a notification to at least one of the group consisting of: a law enforcement provider system, a home security provider system, a medical provider system, and a fire department provider system.

14. The system of claim 8, further comprising:

at least one other sensor, wherein the processor determines whether the at least one sound feature correlates to the unauthorized entry by determining a co-occurrence of the detected sound event using data generated by at least one other sensor.

* * * * *